United States Patent
Yokoshima et al.

(10) Patent No.: US 11,315,743 B2
(45) Date of Patent: Apr. 26, 2022

(54) METHOD OF PRODUCING ELECTROCHEMICAL DEVICE USING TWO WELDING ELECTRODES TO WELD LEAD PLATES

(71) Applicant: TAIYO YUDEN CO., LTD., Tokyo (JP)

(72) Inventors: Katsunori Yokoshima, Takasaki (JP); Hiroto Mori, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 254 days.

(21) Appl. No.: 16/581,698

(22) Filed: Sep. 24, 2019

(65) Prior Publication Data

US 2020/0106077 A1     Apr. 2, 2020

(30) Foreign Application Priority Data

Sep. 28, 2018  (JP) .............................. JP2018-184076

(51) Int. Cl.

| | |
|---|---|
| *H01G 11/74* | (2013.01) |
| *H01G 11/84* | (2013.01) |
| *H01M 10/04* | (2006.01) |
| *H01M 10/0587* | (2010.01) |
| *H01G 11/04* | (2013.01) |
| *H01G 11/30* | (2013.01) |
| *H01M 10/0525* | (2010.01) |

(Continued)

(52) U.S. Cl.
CPC ............ *H01G 11/74* (2013.01); *H01G 11/04* (2013.01); *H01G 11/30* (2013.01); *H01G 11/82* (2013.01); *H01G 11/84* (2013.01); *H01M 10/0431* (2013.01); *H01M 10/0525* (2013.01); *H01M 10/0587* (2013.01); *H01G 11/06* (2013.01)

(58) Field of Classification Search
CPC ............................... H01G 11/82; H01G 11/74
See application file for complete search history.

(56) References Cited

U.S. PATENT DOCUMENTS

2018/0130994 A1    5/2018 Yamaguchi et al.

FOREIGN PATENT DOCUMENTS

| JP | 2007335232 A |   | 12/2007 | | |
|---|---|---|---|---|---|
| JP | 2014067532 A | * | 4/2014 | ............ | H01M 50/54 |
| JP | 2015088277 A | * | 5/2015 | ............ | H01G 11/20 |

(Continued)

*Primary Examiner* — David M Sinclair
(74) *Attorney, Agent, or Firm* — Law Office of Katsuhiro Arai

(57) ABSTRACT

An electrochemical device includes: an electricity storage device that includes positive and negative electrodes stacked via a separator and wound, and lead plates electrically connected to the positive or negative electrode; a connection plate having a first surface on an electricity storage device side and a second surface opposite to the first surface, the lead plates being stacked and welded to the first surface; and a rupture disc connected to the second surface, the lead plates being welded to the connection plate at first and second welding portions on the first surface separated from each other, a lead plate on a connection plate side being welded to the connection plate at the first and second welding portions, a lead plate on a side opposite to the connection plate being welded to the connection plate at the first welding portion and unwelded to the connection plate at the second welding portion.

5 Claims, 16 Drawing Sheets

(51) Int. Cl.
*H01G 11/82* (2013.01)
*H01G 11/06* (2013.01)

(56) References Cited

FOREIGN PATENT DOCUMENTS

| JP | 2017134910 | A | * | 8/2017 | |
|----|------------|---|---|--------|---|
| JP | 2018006114 | A | * | 1/2018 | ............. H01G 11/82 |
| KR | 20060005522 | A | * | 1/2006 | ............. H01M 50/54 |
| WO | WO-2013051273 | A1 | * | 4/2013 | ............. H01G 11/20 |
| WO | WO-2016152372 | A1 | * | 9/2016 | ............. H01G 11/82 |
| WO | 2016174811 | A1 | | 11/2016 | |

* cited by examiner

|  | Welding portion T1 | | | | |
|---|---|---|---|---|---|
| Welding portion T2 | 1 | 2 | 3 | 4 | 5 |
| 1 | ◎ | ◎ | ◎ | × | × |
| 2 | — | ○ | ○ | ○ | △ |
| 3 | — | — | △ | △ | △ |
| 4 | — | — | — | × | × |
| 5 | — | — | — | — | × |

FIG.20

METHOD OF PRODUCING ELECTROCHEMICAL DEVICE USING TWO WELDING ELECTRODES TO WELD LEAD PLATES

CROSS REFERENCE TO RELATED APPLICATIONS

This application claims the benefit of Japanese Priority Patent Application JP 2018-184076 filed Sep. 28, 2018, the entire contents of which are incorporated herein by reference.

BACKGROUND

The present disclosure relates to an electrochemical device including a conduction path joined by resistance welding and a method of producing the same.

As an electrochemical device such as a lithium ion capacitor, a wound type electrochemical device in which a positive electrode and a negative electrode separated via a separator are wound is often used. Each of the positive electrode and the negative electrode is connected to a terminal via a lead member.

In the electrochemical device, by elongating the electrode, the capacity can be increased and the resistance can be reduced. However, in the case of elongating the electrode, it is difficult to achieve sufficient output characteristics due to the length of the electrode. In order to solve the problem, a plurality of lead members is connected to the electrode, and the electrode and the terminal are connected to each other via the plurality of lead members.

For example, Japanese Patent Application Laid-open No. 2007-335232 discloses a secondary battery in which a plurality of lead plates is stacked at one point and the overlapping portion is connected to a sealing body. Further, WO 2016/174811 discloses a method of connecting a plurality of lead plates to a sealing body via a current collector.

SUMMARY

However, direct connection to the sealing body by the method disclosed in Japanese Patent Application Laid-open No. 2007-335232 is difficult and is not feasible. Further, there is a possibility that the method disclosed n WO 2016/174811 leads to an increase in the number of parts and reduction in output performance due to the connection resistance between the current collector plate and the lead plate.

In view of the above-mentioned circumstances, it is desired to provide an electrochemical device that includes a conduction path having low resistance and is capable of achieving high output characteristics, and a method of producing the same.

In accordance with an embodiment of the present disclosure, there is provided an electrochemical device, including: an electricity storage device; a connection plate; and a rupture disc.

The electricity storage device includes a positive electrode, a negative electrode, and a separator, the positive electrode and the negative electrode being stacked via the separator and wound, the electricity storage device further including a plurality of lead plates electrically connected to one of the positive electrode and the negative electrode.

The connection plate has a first main surface on a side of the electricity storage device and a second main surface opposite to the first main surface, the plurality of lead plates being stacked and welded to the first main surface.

The rupture disc is connected to the second main surface of the connection plate.

The plurality of lead plates is welded to the connection plate at a first welding portion on the first main surface and a second welding portion on the first main surface, the second welding portion being separated from the first welding portion, the lead plate on a side of the connection plate among the plurality of lead plates being welded to the connection plate at the first welding portion and the second welding portion, the lead plate on a side opposite to the connection plate among the plurality of lead plates being welded to the connection plate at the first welding portion and unwelded to the connection plate at the second welding portion.

With this configuration, since the rupture disc is connected to the second main surface of the connection plate, it is necessary to perform series resistance welding in which a current flows between the welding electrodes caused to abut on the lead plate on the side of the first main surface in order to join the lead plate to the first main surface. Note that the lead plate on the side of the connection plate is welded to the connection plate at two portions, i.e., the first welding portion and the second welding portion, and the lead plate on the side opposite to the connection plate is welded to the connection plate at the first welding portion and unwelded at the second welding portion. When forming this structure by resistance welding, the lead plate on the side opposite to the connection plate does not provide a conduction path between the first welding portion and the second welding portion, and it is possible to prevent the lead plate from being welded and cut even if a large current is applied between the welding electrodes. Therefore, the lead plate is reliably welded to the connection plate, and it is possible to obtain an electrochemical device that includes a conduction path having low resistance and is capable of achieving a high output characteristics.

The number of lead plates welded at the first welding portion may be two, and the number of lead plates welded at the second welding portion may be one.

The number of lead plates welded at the first welding portion may be not less than three, and the number of lead plates welded at the second welding portion may be two less than the number of lead plates welded at the first welding portion.

The plurality of lead plates may be formed of aluminum.

The electrochemical device may be a lithium ion capacitor.

In accordance with an embodiment of the present disclosure, there is provided a method of producing an electrochemical device, including: preparing an electricity storage device that includes a positive electrode, a negative electrode, and a separator, the positive electrode and the negative electrode being stacked via the separator and wound, the electricity storage device further including a plurality of lead plates electrically connected to one of the positive electrode and the negative electrode, a connection plate having a first main surface on a side of the electricity storage device and a second main surface opposite to the first main surface, and a rupture disc connected to the second main surface of the connection plate.

The plurality of lead plates is stacked and the plurality of stacked lead plates is caused to abut on the first main surface to form a first welding portion and a second welding portion, the plurality of lead plates being stacked at the first welding portion, a lead plate whose number being less than the number of lead plates stacked at the first welding portion is stacked at the second portion.

A first welding electrode is caused to abut on the first welding portion, a second welding electrode is caused to abut on the second welding portion, and a current is applied between the first welding electrode and the second welding electrode to weld the plurality of lead plates to the connection plate.

As described above, in accordance with the present disclosure, it is possible to provide an electrochemical device that includes a conduction path having low resistance and is capable of achieving high output characteristics, and a method of producing the same.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 20 is a cross-sectional view showing an evaluation result based on the difference in the number of positive lead plates at two welding positions.

DETAILED DESCRIPTION OF EMBODIMENTS

An electrochemical device according to an embodiment of the present disclosure will be described.

Configuration of Electrochemical Device

Figure 1:
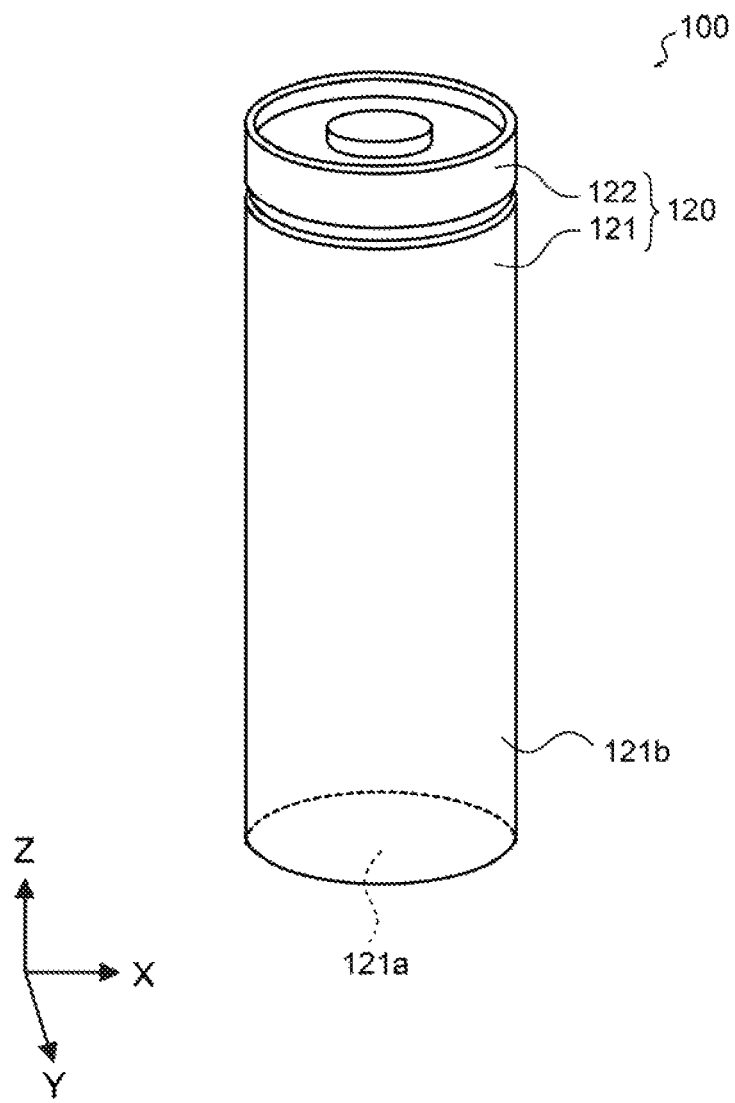
FIG. 1 is a perspective view showing an electrochemical device according to an embodiment of the present disclosure.
Figure 2:
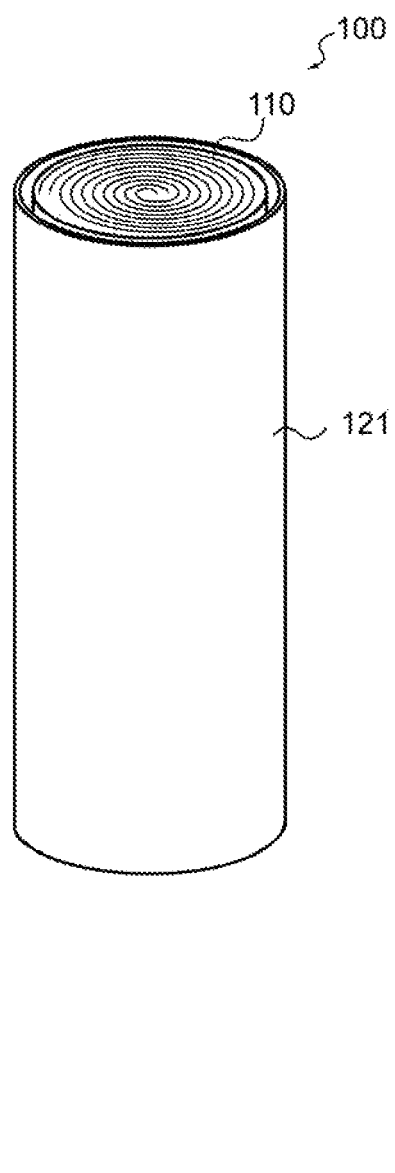
FIG. 2 is a perspective view showing a partial configuration of the electrochemical device.
Figure 2:
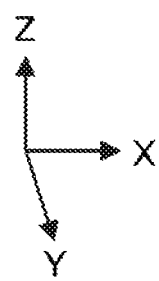

FIG. 1 is a perspective view showing an electrochemical device 100 according to an embodiment of the present disclosure, and FIG. 2 is a perspective view showing a partial configuration of the electrochemical device 100. Note that in the following drawings, X-, Y-, and Z-directions are three directions orthogonal to each other.

The electrochemical device 100 only needs to be a device capable of charging and discharging, and may be any of various electrochemical devices such as a lithium ion capacitor, an electric double layer capacitor, and a lithium ion secondary battery.

As shown in FIG. 1 and FIG. 2, the electrochemical device 100 includes an electricity storage device 110 and a container 120. The electrochemical device 100 has a cylindrical shape, and can have a diameter (X-Y direction) of 18 mm and a length (Z-direction) of 65 mm, for example.

As shown in FIG. 1, the container 120 includes an exterior can 121 and a sealing body 122.

The exterior can 121 is formed of metal, and includes a can bottom portion 121a and a side wall portion 121b. The can bottom portion 121a has a disk shape. The side wall portion 121b has a cylindrical shape that is continuous with the periphery of the can bottom portion 121a. The side wall portion 121b is covered by an insulating film.

The sealing body 122 is formed of metal and joined to the side wall portion 121b to seal the internal space of the exterior can 121. The configuration of the sealing body 122 will be described below.

As shown in FIG. 2, the electricity storage device 110 and an electrolyte (not shown) are housed in the exterior can 121 and sealed by the sealing body 122, thereby forming the electrochemical device 100.

Figure 3:
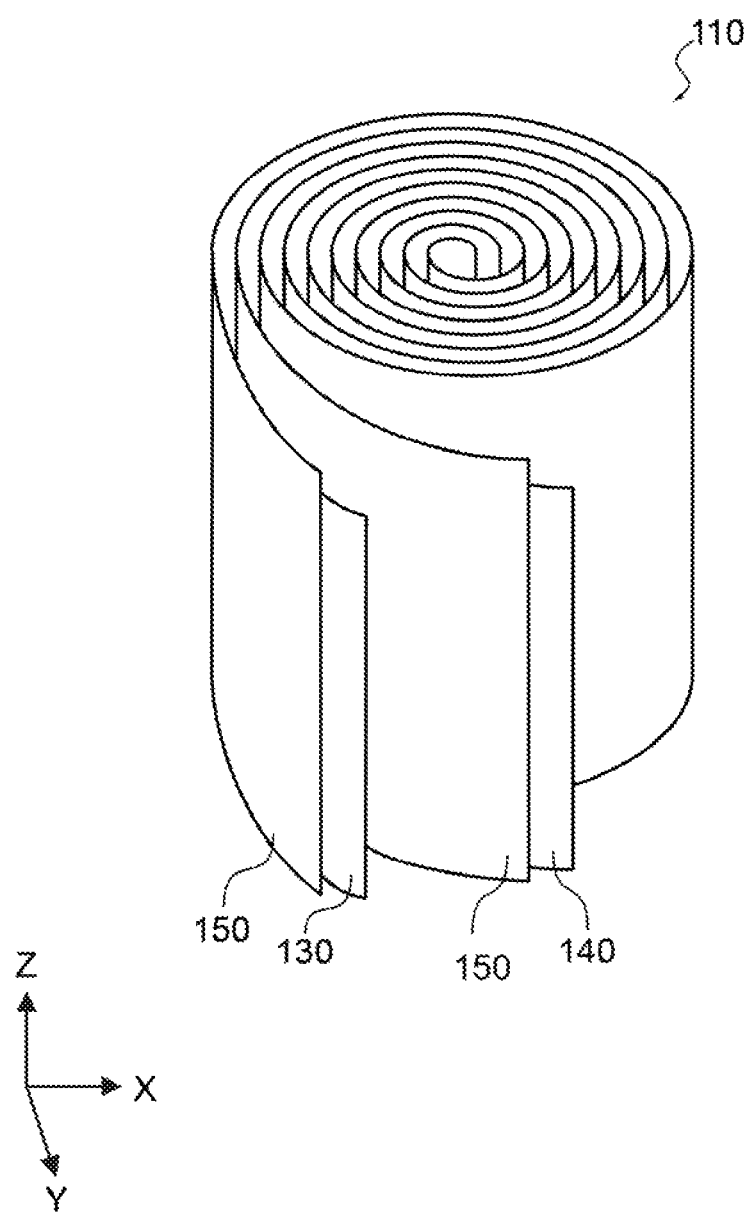
FIG. 3 is a perspective view showing an electricity storage device of the electrochemical device.
Figure 4:
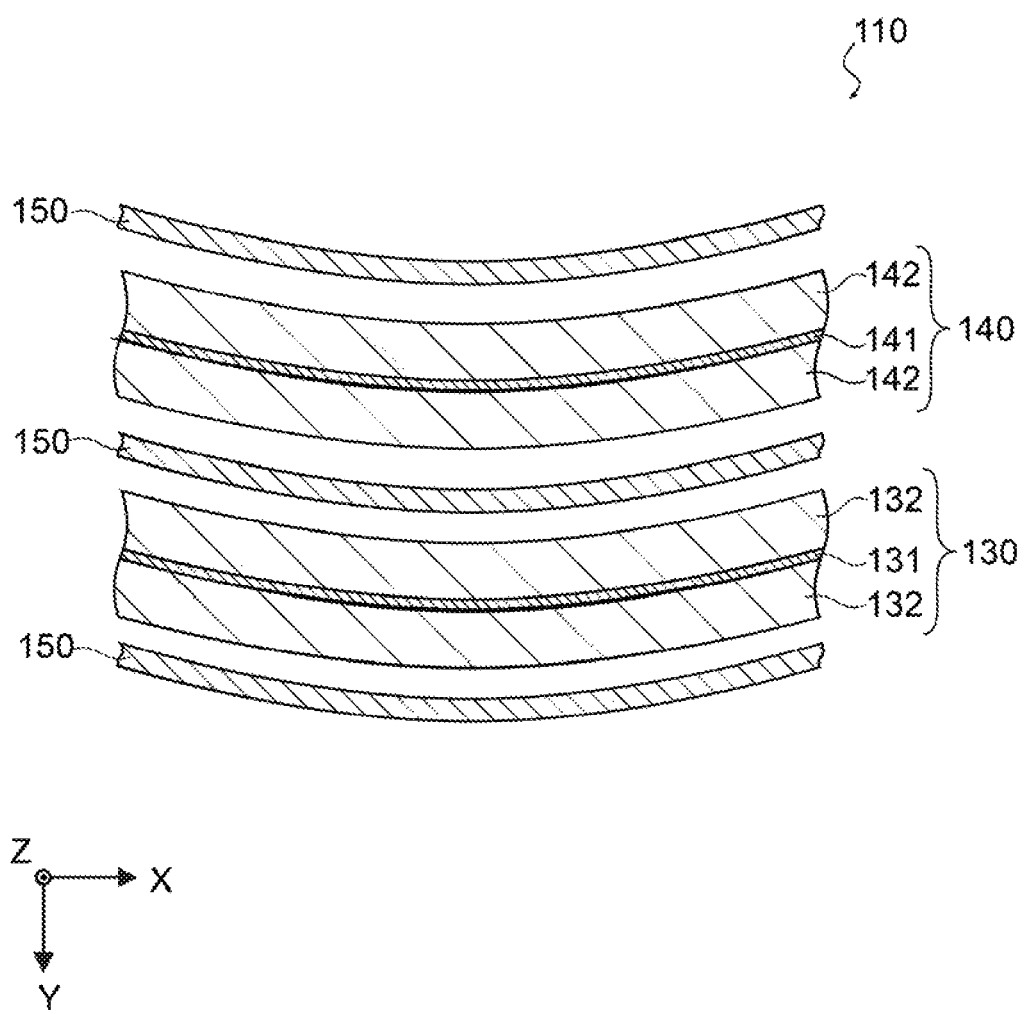
FIG. 4 is a cross-sectional view of the electricity storage device.

FIG. 3 is a perspective view showing the electricity storage device 110. FIG. 4 is an enlarged cross-sectional view of the electricity storage device 110. As shown in the figures, the electricity storage device 110 includes a negative electrode 130, a positive electrode 140, and a separator 150. A stacked body obtained by stacking the negative electrode 130, the positive electrode 140, and the separator 150 is wound to form the electricity storage device 110.

As shown in FIG. 4, the negative electrode 130 includes a negative electrode current collector 131 and a negative electrode active material layer 132. The negative electrode current collector 131 is formed of a conductive material, and can be a metal foil such as a copper foil. It is favorable that the negative electrode current collector 131 includes a metal foil having a surface that is chemically or mechanically roughened or a metal foil in which a through hole is formed.

The negative electrode active material layer 132 is formed on both of the front surface and the back surface of the negative electrode current collector 131. The material of the negative electrode active material layer 132 may be a mixture of a negative electrode active material and a binder resin, and may further contain a conductive aid. The negative electrode active material can be, for example, a carbon-based material such as hard carbon, graphite, and soft carbon.

The binder resin is a synthetic resin that joins a negative electrode active material, and can be, for example, carboxymethylcellulose, styrene butadiene rubber, polyethylene, polypropylene, aromatic polyamide, fluorinated rubber, polyvinylidene fluoride, isoprene rubber, butadiene rubber, or ethylene propylene rubber.

The conductive aid is particles formed of a conductive material, and improves the conductivity with the negative electrode active material. Examples of the conductive aid include a carbon material such as graphite and carbon black. These materials may be used alone, or two or more of them may be used in combination. Note that the conductive aid may be a metal material, a conductive polymer, or the like as long as the material is electrochemically stable and has conductivity.

Figure 5:
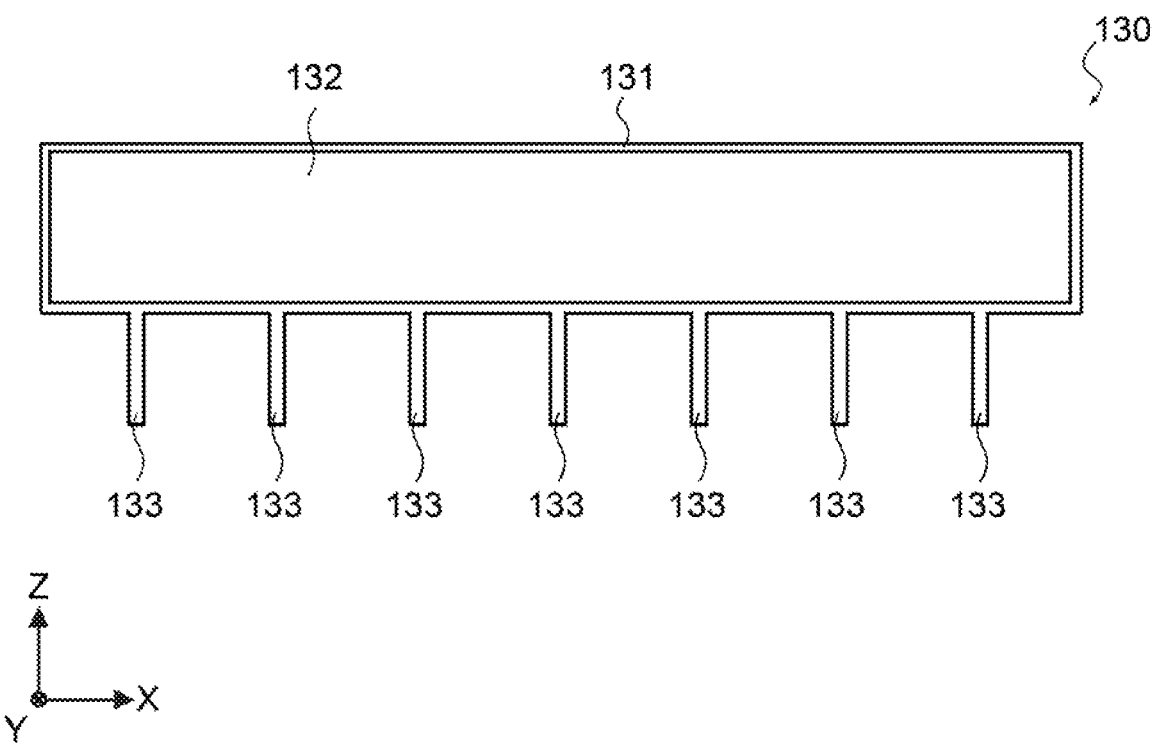
FIG. 5 is a plan view showing a negative electrode of the electricity storage device.

FIG. 5 is a plan view showing the negative electrode 130 before being wound. As shown in FIG. 5, the negative electrode active material layer 132 is stacked on most of the surface of the negative electrode current collector 131. Further, similarly, the negative electrode active material layer 132 (not shown) is stacked also on the back surface of the negative electrode current collector 131.

Further, the negative electrode 130 includes a plurality of negative electrode lead plates 133. A part of the negative electrode current collector 131 projects, thereby forming each of the negative electrode lead plates 133. As will be described below, the negative electrode lead plates 133 are connected to the exterior can 121, and electrically connect the exterior can 121 and the negative electrode 130.

Note that each of the negative electrode lead plates 133 does not necessarily need to be a projecting part of the negative electrode current collector 131, and may be a plate-like or foil-like member electrically connected to the negative electrode current collector 131, which is different from the negative electrode current collector 131. The number of the negative electrode lead plates 133 is not limited to seven shown in FIG. 5, and may be an arbitrary number of one or more.

As shown in FIG. 4, the positive electrode 140 includes a positive electrode current collector 141 and a positive electrode active material layer 142. The positive electrode current collector 141 is formed of a conductive material, and can be a metal foil such as an aluminum foil. It is favorable that the positive electrode current collector 141 includes a metal foil having a surface that is chemically or mechanically roughened or a metal foil in which a through hole is formed.

The positive electrode active material layer 142 is formed on both of the front surface and the back surface of the positive electrode current collector 141. The material of the positive electrode active material layer 142 can be a mixture of a positive electrode active material and a binder resin, and may further contain a conductive aid. Examples of the positive electrode active material include activated carbon, PAS (Polyacenic Semiconductor: polyacenic organic semiconductor), or the like.

The binder resin is a synthetic resin that joins a positive electrode active material, and can be, for example, carboxymethylcellulose, styrene butadiene rubber, polyethylene, polypropylene, aromatic polyamide, fluorinated rubber, polyvinylidene fluoride, isoprene rubber, butadiene rubber, or ethylene propylene rubber.

The conductive aid is particles formed of a conductive material, and improves the conductivity with the positive electrode active material. Examples of the conductive aid include a carbon material such as graphite and carbon black. These materials may be used alone, or two or more of them may be used in combination. Note that the conductive aid may be a metal material, a conductive polymer, or the like as long as the material is electrochemically stable and has conductivity.

Figure 6:
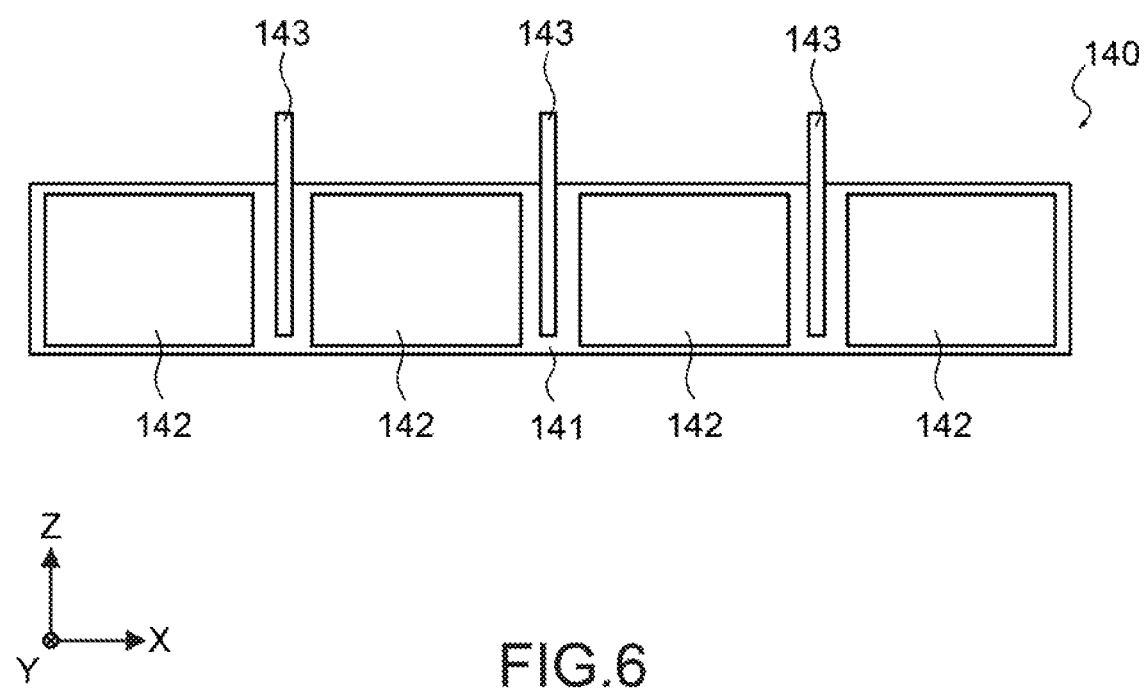
FIG. 6 is a plan view showing a positive electrode of the electricity storage device.

FIG. 6 is a plan view showing the positive electrode 140 before being wound. As shown in FIG. 6, the positive electrode active material layer 142 is stacked on most of the surface of the positive electrode current collector 141. Further, similarly, the positive electrode active material layer 142 (not shown) is stacked also on the back surface of the positive electrode current collector 141.

Further, the positive electrode 140 includes a positive electrode lead plate 143. The positive electrode lead plate 143 is formed of plate-like or foil like metal, and is connected to an area, to which the positive electrode active material layer 142 is not applied, on the positive electrode current collector 141. The positive electrode lead plate 143 is formed of the same material as the positive electrode current collector 141, and can be formed of, for example, aluminum. As will be described below, the positive electrode lead plate 143 is connected to the sealing body 122, and electrically connects the sealing body 122 and the positive electrode 140.

Note that a part of the positive electrode current collector 141 may protrude to form the positive electrode lead plate 143. The number of the positive electrode lead plates 143 is not limited to three shown in FIG. 5, and only needs to be two or more.

The separator 150 is disposed between the negative electrode 130 and the positive electrode 140, insulates the negative electrode 130 and the positive electrode 140, and causes ions contained in the electrolyte to be transmitted therethrough. The separator 150 can be a porous sheet formed of woven fabric, non-woven fabric, glass fiber, cellulose fiber, plastic fiber, or the like.

The electrochemical device 100 is configured as described above. The electrolyte to be housed in the container 120 together with the electricity storage device 110 can be arbitrarily selected in accordance with the type of the electrochemical device 100.

Regarding Electrical Connection Between Electricity Storage Device and Exterior Can In the electrochemical device 100, the electricity storage device 110 is electrically connected to the container 120, and charging and discharging of the electricity storage device 110 are performed via the container 120.

Figure 7:
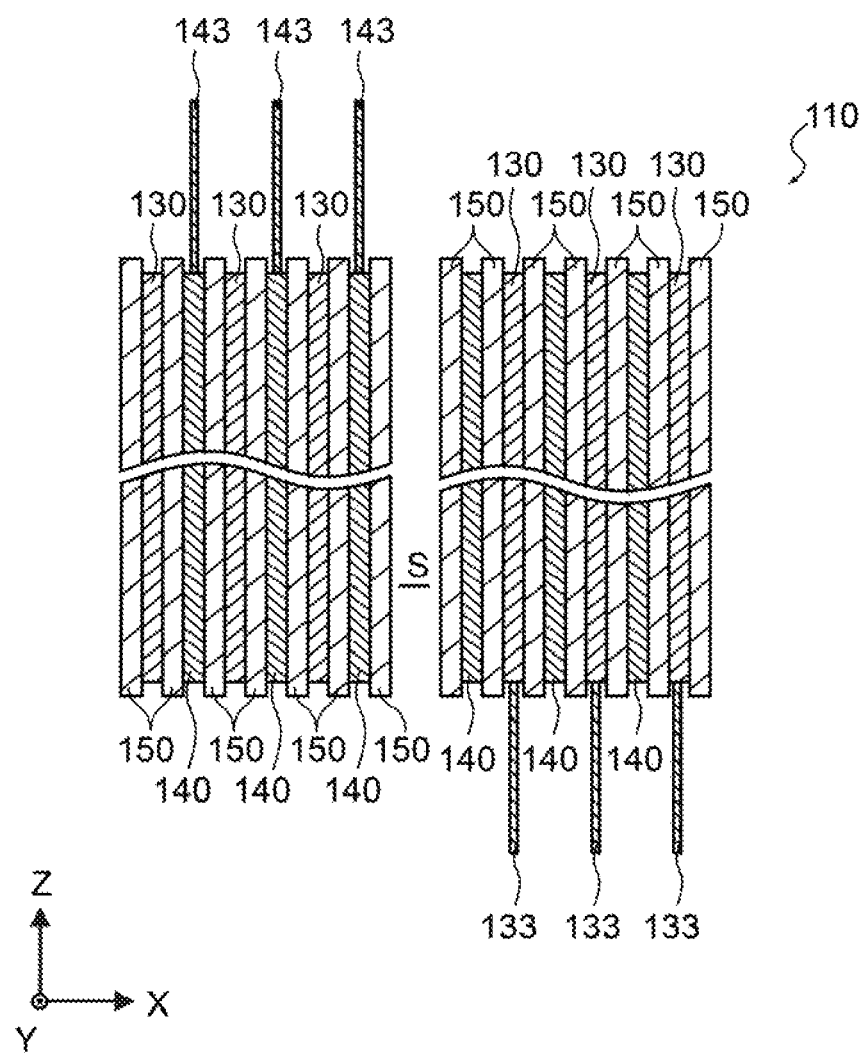
FIG. 7 is a schematic diagram showing a negative electrode lead plate and a positive electrode lead plate of the electricity storage device.

FIG. 7 is a schematic cross-sectional view of the electricity storage device 110. As shown in FIG. 7, the negative electrode 130 and the positive electrode 140 are separated via the separator 150 and wound. As shown in FIG. 7, a hole at the winding center will be referred to as "central hole S". The negative electrode lead plates 133 projects from the negative electrode 130 to one side (downward in FIG. 7) of the electricity storage device 110, and the positive electrode lead plate 143 projects from the positive electrode 140 to the opposite side (upward in FIG. 7).

Figure 8:
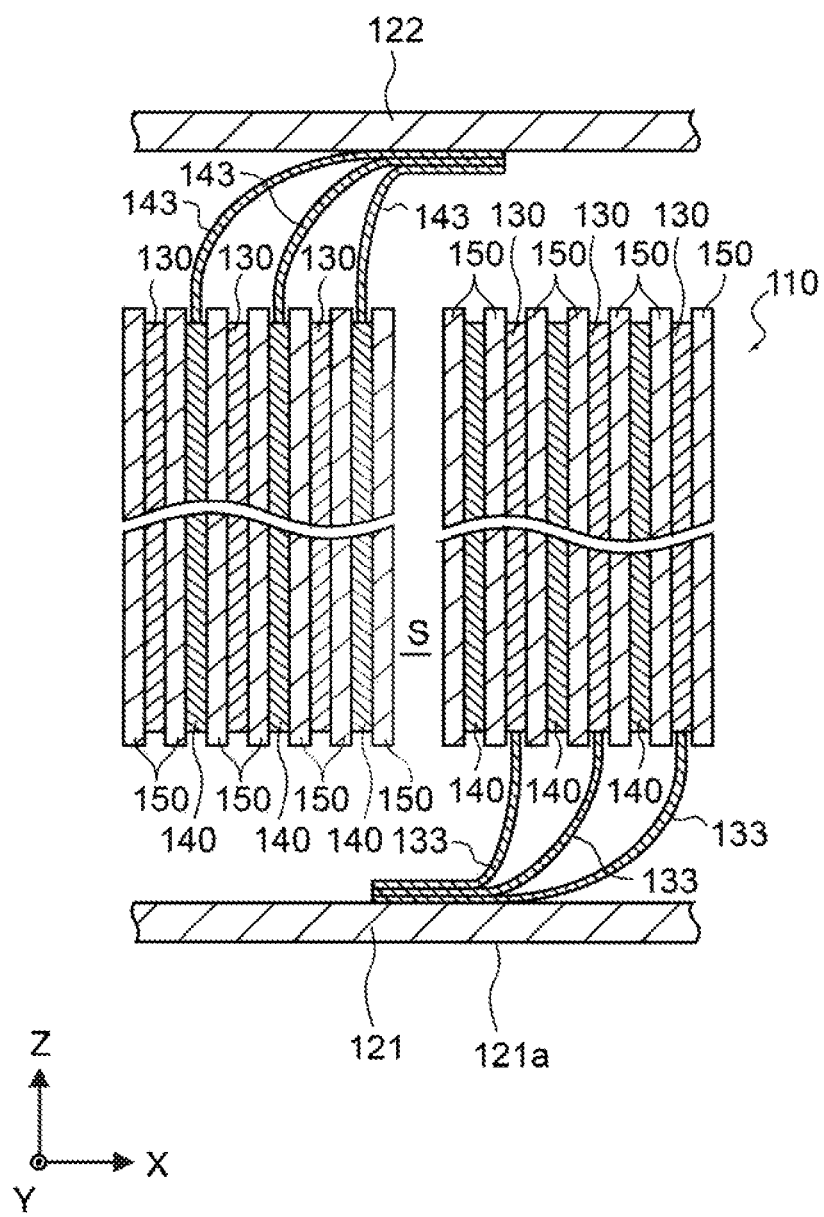
FIG. 8 is a schematic diagram showing a mode of electrical connection between the electricity storage device and a container.

FIG. 8 is a schematic diagram showing the electrical connection between the electricity storage device 110 and the container 120. As shown in FIG. 8, the negative electrode lead plates 133 is joined to the exterior can 121, and the positive electrode lead plate 143 is joined to the sealing body 122. As a result, the can bottom portion 121a of the exterior can 121 functions as a negative electrode terminal, and the sealing body 122 functions as a positive electrode terminal.

Note that the positive electrode lead plate 143 and the sealing body 122 are joined by series resistance welding as described below.

Configuration of Sealing Body

Figure 9:
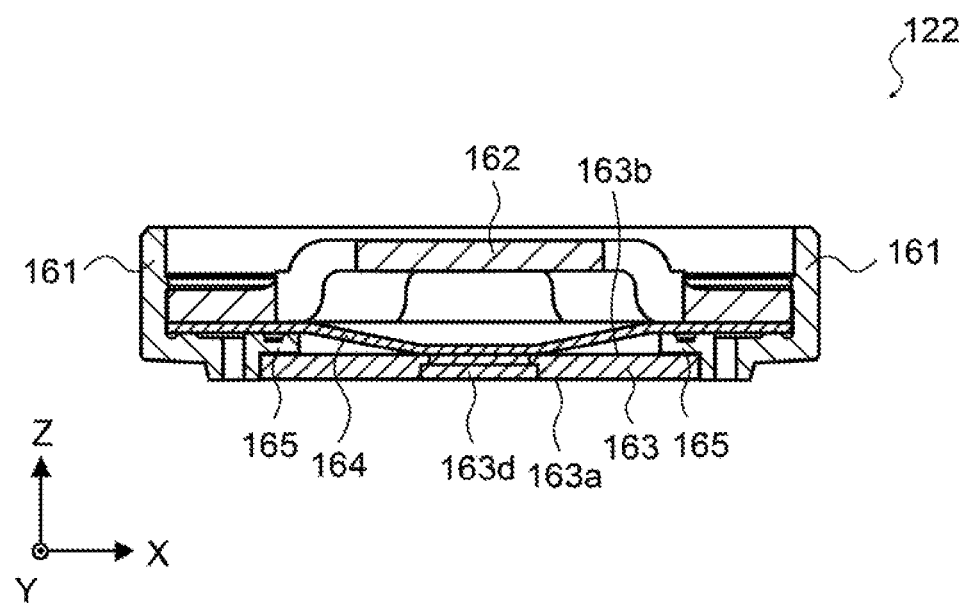
FIG. 9 is a cross-sectional view of a sealing body of the electrochemical device according to an embodiment of the present disclosure.
Figure 10:
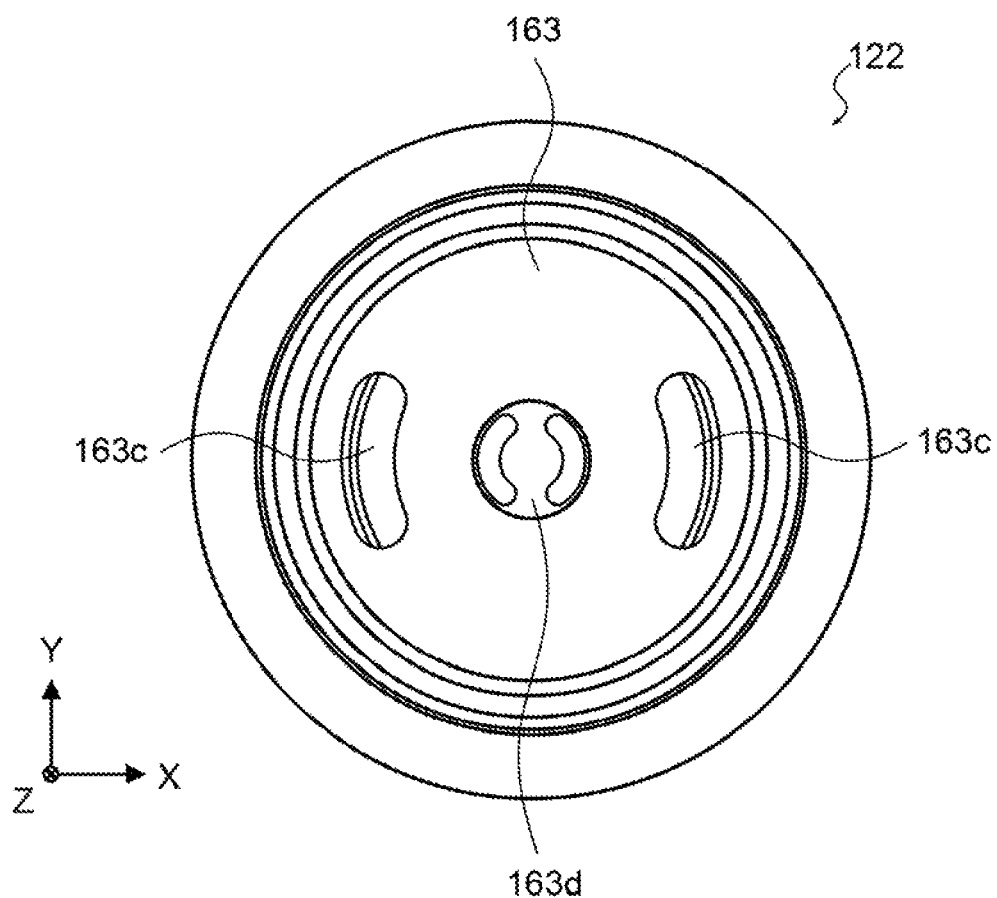
FIG. 10 is a plan view showing the sealing body of the electrochemical device.

FIG. 9 is a cross-sectional view of the sealing body 122. FIG. 10 is a plan view showing the sealing body 122 viewed from the side of the electricity storage device 110.

As shown in the figures, the sealing body 122 includes a frame member 161, an external terminal 162, a connection plate 163, a rupture disc 164, and an insulator 165.

The frame member 161 is fitted to the exterior can 121, and fixes the sealing body 122 to the exterior can 121. The frame member 161 can have an annular shape.

The external terminal 162 is fixed to the frame member 161, and functions as a positive electrode terminal of the electrochemical device 100.

The connection plate 163 is a has a disk shape, is disposed on the side of the electricity storage device 110 (downward in the figure) in the sealing body 122, and is a portion to which the positive electrode lead plate 143 is joined.

Figure 11:
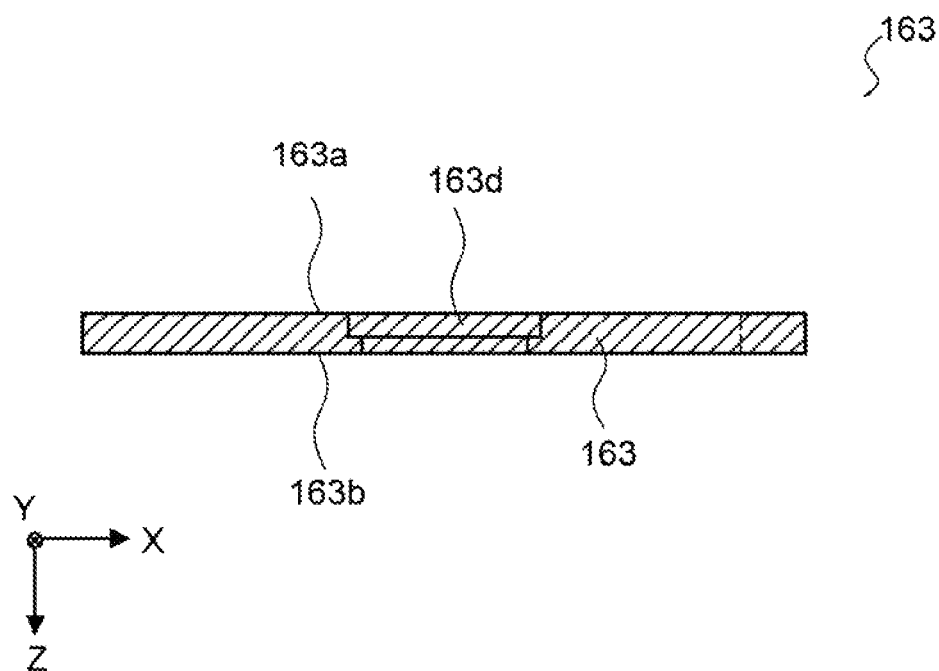
FIG. 11 is a cross-sectional view of a connection plate of the sealing body.

FIG. 11 is a cross-sectional view of the connection plate 163. As shown in FIG. 11, the connection plate 163 includes a first main surface 163a and a second main surface 163b. The first main surface 163a is a surface on the side of the electricity storage device 110, and the second main surface 163b is a surface opposite to the first main surface 163a.

Further, as shown in FIG. 10, the connection plate 163 includes a through hole 163c and a recessed portion 163d. The through hole 163c is a hole that is in communication with the first main surface 163a and the second main surface 163b, and gas generated when an abnormality occurs in the electricity storage device 110 passes through the hole. The number and shape of the through holes 163c are not particularly limited. The through holes 163c are disposed to avoid the area (to be described below) to be welded.

The recessed portion 163d is a portion of the connection plate 163, which has a reduced thickness, and is provided in the inner peripheral area of the second main surface 163b, and the rupture disc 164 is connected to the portion.

The rupture disc 164 is connected to the recessed portion 163d in the second main surface 163b, and electrically connects the connection plate 163 and the external terminal 162. The connection portion of the rupture disc 164 with the recessed portion 163d is broken when gas is generated from the electricity storage device 110, thereby insulating the connection plate 163 and the external terminal 162 from each other.

The insulator 165 is disposed between the rupture disc 164 and the connection plate 163 to insulate the rupture disc 164 and the connection plate 163 from each other. The insulator 165 has an annular shape, and abuts on the outer peripheral area of the second main surface 163b as shown in FIG. 9.

The frame member 161, the external terminal 162, the connection plate 163, and the rupture disc 164 are each formed of a metal material, and are each favorably formed of the same material. Examples of such a material include aluminum, an alloy containing aluminum, and stainless steel. The insulator 165 is formed of an insulating material such as a resin.

Regarding Welding of Positive Electrode Lead Plate to Connection Plate

Figure 12:
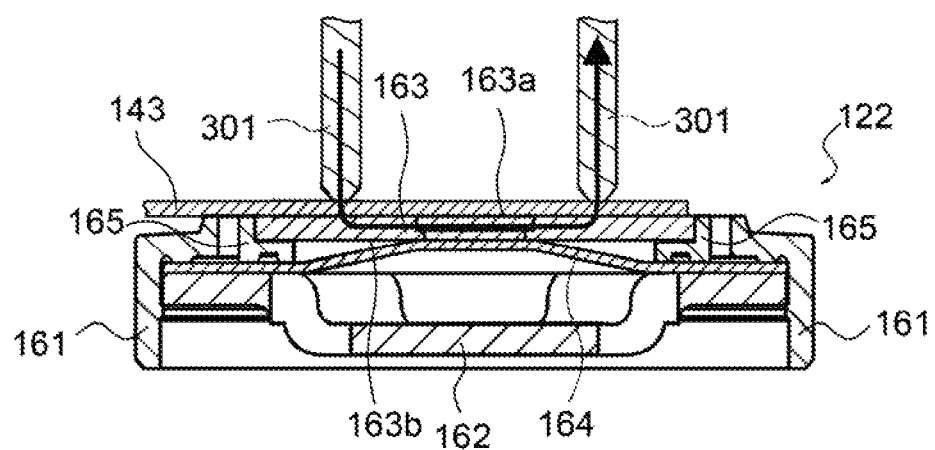
FIG. 12 is a cross-sectional view showing a mode of welding one positive lead plate to the connection plate of the sealing body.
Figure 13:
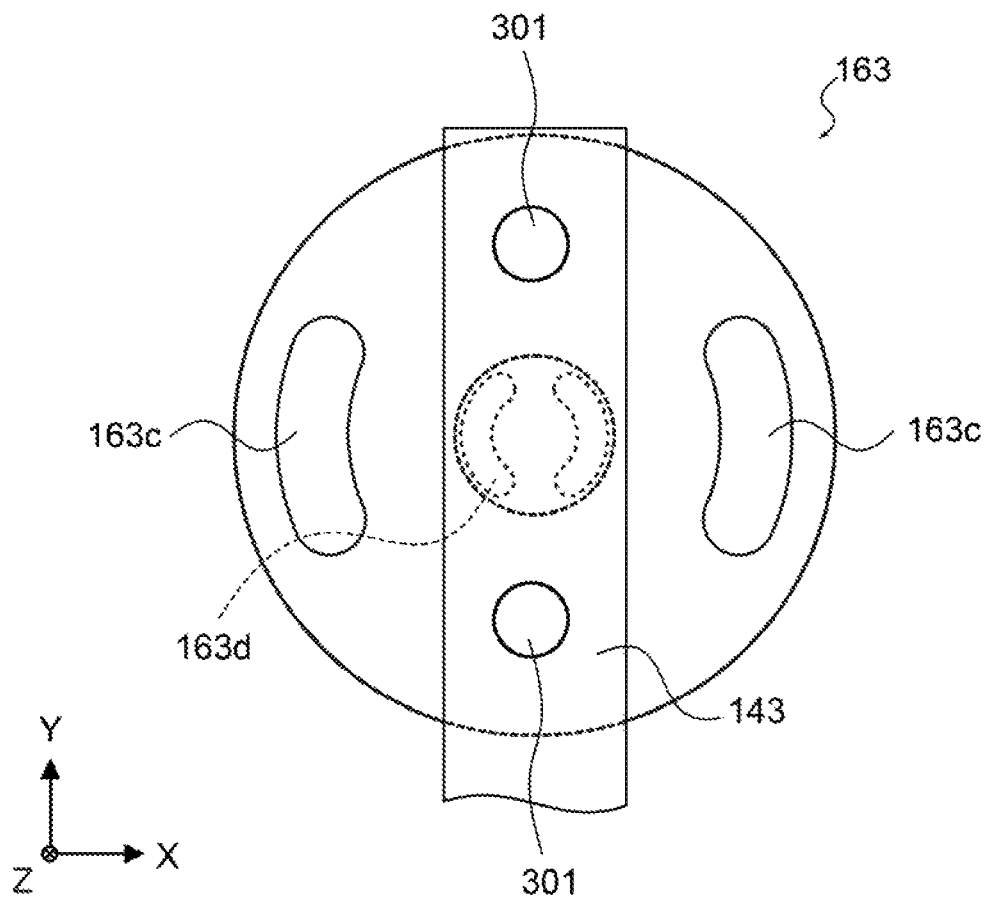
FIG. 13 is a plan view showing a mode of welding one positive lead plate to the connection plate of the sealing body by a general method.

As described above, the positive electrode lead plate 143 is electrically connected to the sealing body 122. Specifically, the positive electrode lead plate 143 is welded to the connection plate 163 by resistance welding. FIG. 12 is a cross-sectional view when welding the positive electrode lead plate 143 to the connection plate 163, and FIG. 13 is a plan view at this time. Note that although the number of positive lead plates 143 to be welded is actually two or more, a case where one positive lead plate 143 is welded will be described first.

As shown in the figures, at the time of welding, the positive electrode lead plate 143 is disposed on the first main surface 163a, and two welding electrodes 301 are caused to abut on the positive electrode lead plate 143. In this state, a current is applied between the two welding electrodes 301. As a result, a current flows between the two welding electrodes 301 via the positive electrode lead plate 143 and the connection plate 163 as shown by an arrow. Thus, the positive electrode lead plates 143 are welded, and the positive electrode lead plate 143 and the connection plate 163 are welded (resistance welding).

As described above, the rupture disc 164 and the external terminal 162 are provided on the side of the second main surface 163b of the connection plate 163, and a welding electrode cannot be disposed on the side of the second main surface 163b. For this reason, it is necessary to perform resistance welding (series resistance welding) by causing the two welding electrodes 301 to abut on the side of the first main surface 163a to cause a current to flow between the two electrodes.

Figure 14:
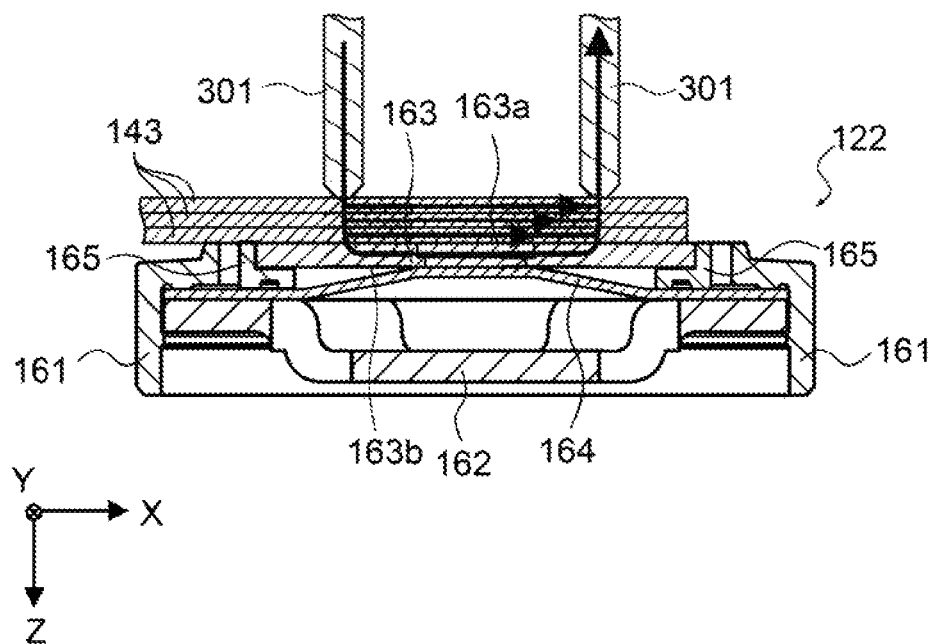
FIG. 14 is a cross-sectional view showing a mode of welding three positive lead plates to the connection plate of the sealing body by a general method by a general method.

Note that in the case where the number of the positive lead plates 143 to be welded is one, welding can be performed without any problem. However, in the case where the positive lead plate 143 includes a plurality of positive lead plates 143, the following problem occurs. FIG. 14 is a schematic diagram showing a case where three positive lead plates 143 are welded by resistance welding.

In the case where the number of the positive lead plates 143 to be welded is two or more, as shown in FIG. 14, a current that flows between the welding electrodes 301 is diverted also to the positive lead plates 143, which is a conductor, in addition to the connection plate 163.

Further, in the case where the plurality of positive lead plates 143 are welded, it is necessary to increase the current value between the welding electrodes 301 as compared with the case where the number of the positive lead plates 143 is one because the contact resistance between the positive lead plates 143 increases.

As a result, each of the positive lead plates 143 cannot withstand the current diverted to the positive lead plate 143, and is melted and cut. In particular, the positive lead plate 143 on the uppermost layer (on the side opposite to the connection plate 163) among the plurality of positive lead plates 143 is easily melted and cut because the distance to the welding electrodes 301 is the shortest. In the case where the positive electrode lead plate 143 is melted and cut, it is difficult to electrically connect the positive lead plate 143 and a connection plate to each other.

Meanwhile, if the current value is reduced so that the positive lead plate 143 is not melted and cut, resistance heating is insufficient and it is difficult to perform reliable welding.

Note that as shown in FIG. 12, a current is diverted also in the case where the number of the positive lead plates 143 is one, and the current flows to the positive lead plate 143. In the case where one positive lead plate 143 is welded, the positive lead plate 143 is not welded and cut because the current value necessary for resistance welding is small.

Figure 15:
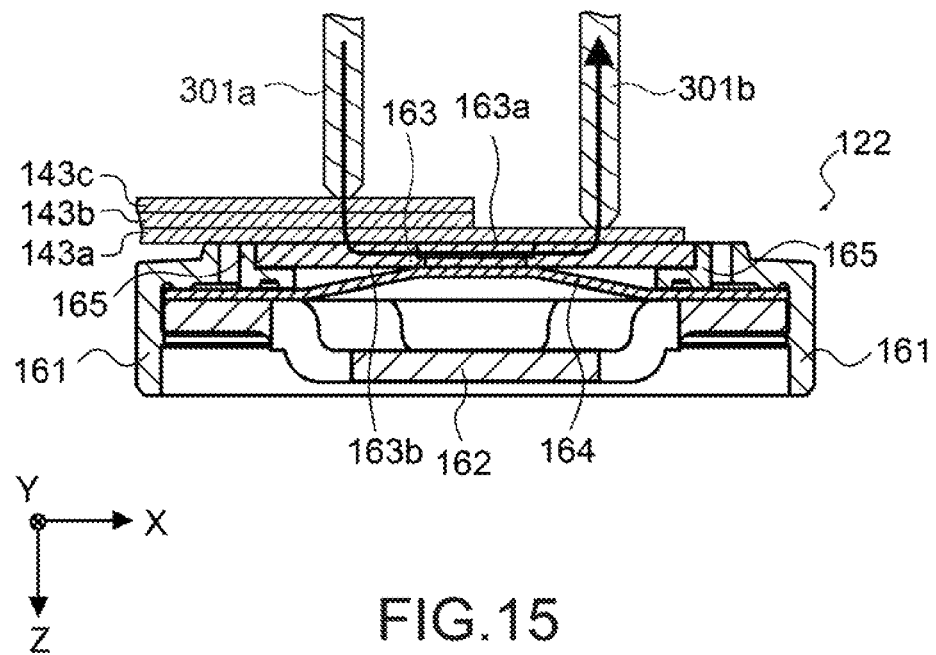
FIG. 15 is a cross-sectional view showing a mode of welding three positive lead plates to the connection plate of the sealing body by a general method by a method according to an embodiment of the present disclosure.

Meanwhile, in an embodiment of the present disclosure, resistance welding is performed as follows. FIG. 15 is a cross-sectional view at the time of welding the positive lead plate 143 to the connection plate 163 by a method according to the embodiment of the present disclosure, and FIG. 16 is a plan view at this time.

Note that in the following description, one of the two welding electrodes 301 will be referred to as "welding electrode 301a", and the other will be referred to as "welding electrode 301b". Further, the positive lead plates 143 will be referred to as "positive lead plate 143a", "positive lead plate 143b", and "positive lead plate 143c" in the order from the side of the connection plate 163.

Figure 16:
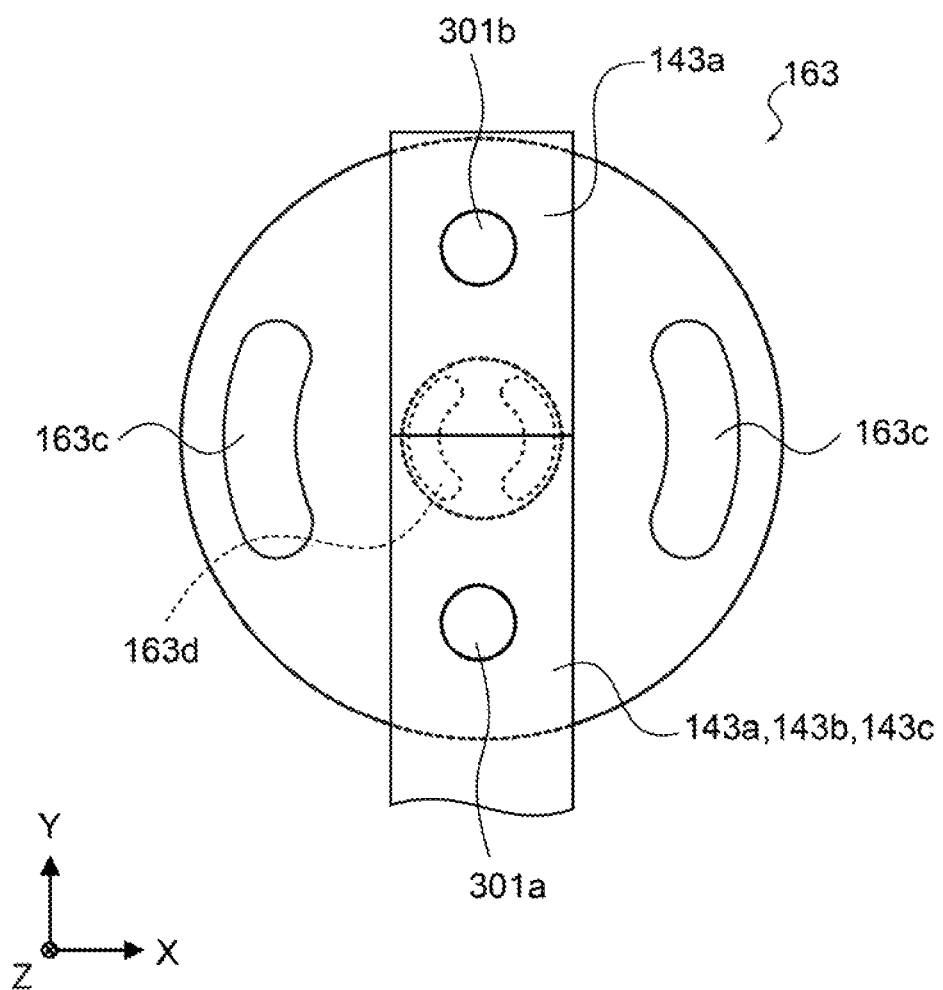
FIG. 16 is a cross-sectional view showing a mode of welding three positive lead plates to the connection plate of the sealing body by a general method by a method according to an embodiment of the present disclosure.

As shown in FIG. 15 and FIG. 16, the positive lead plates 143b and 143c are disposed on the connection plate 163 so as to offset with respect to the positive lead plate 143a. The welding electrode 301a abuts on the positive lead plate 143c, and the welding electrode 301b abuts on the positive lead plate 143a.

In this state, a current is caused to flow between the welding electrode 301a and the welding electrode 301b to weld the positive lead plate 143 and the connection plate 163 by resistance welding. Since the positive lead plates 143b and 143c do not abut on the welding electrode 301b, a current does not substantially flow to the positive lead plate 143b and 143c, which prevents the positive lead plate 143b and 143c from being melted and cut.

As shown in FIG. 14, normally, the positive lead plate 143 on the upper layer side is the shortest conduction path where it is easy to cause the positive lead plate to be melted and cut. However, by interrupting the shortest conduction path, it is possible to cause a current to flow to the lower layer, and reliably perform resistance welding by causing a large current to flow to the welding electrodes 301 while preventing the positive lead plate 143 from being melted and cut.

Figure 17:
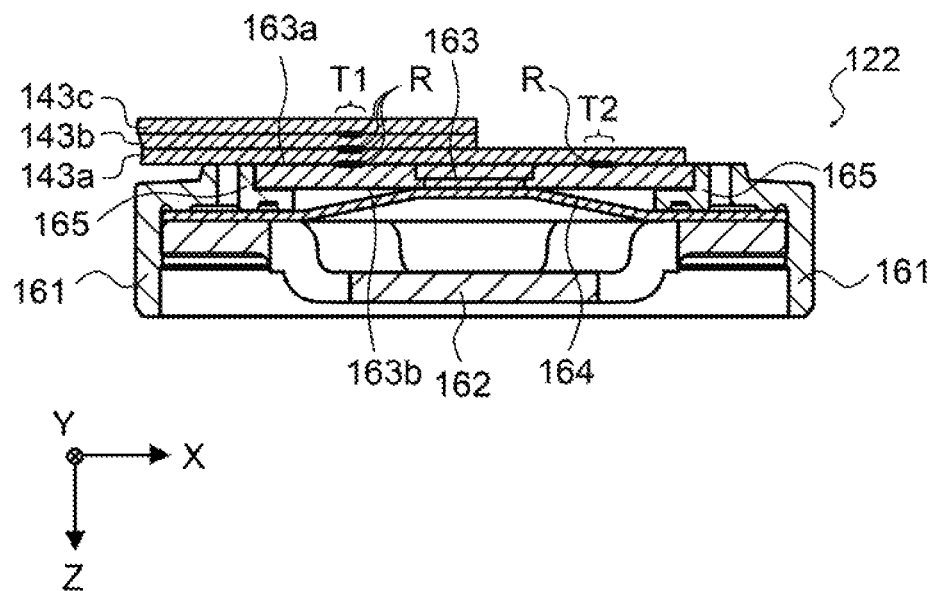
FIG. 17 is a cross-sectional view showing the positive lead plate welded to the connection plate of the sealing body.

FIG. 17 is a schematic diagram showing the positive lead plate 143 welded by resistance welding. As shown in FIG. 17, a portion that the welding electrode 301a abuts on and a portion that the welding electrode 301b abuts on will be referred to as "welding portion T1" and "welding portion T2". Further, portions joined by welding between the positive lead plates 143 and between the positive lead plate 143 and the connection plate 163 will be referred to as "connection portions R".

The positive lead plate 143a in the lower layer (on the side of the connection plate 163) is welded at both the welding portion T1 and the welding portion T2. Meanwhile, the positive lead plates 143b and 143c in the upper layer (on the side opposite to the connection plate 163) are welded at only the welding portion T1 and not at the welding portion T2. In other words, the number of the positive lead plates 143 welded at the welding portion T1 is larger than the number of the positive lead plates 143 welded at the welding portion T2.

Note that although the positive lead plate 143b may be welded at both the welding portion T1 and the welding portion T2 similarly to the positive lead plate 143a, it is favorable that the positive lead plate 143b is welded at only the welding portion T1 because a large current can be used for resistance welding.

As described above, by bringing the positive lead plate 143 on the upper layer side into contact with only one of the welding electrodes 301, it is possible to reliably weld the plurality of positive lead plates 143 to the connection plate 163, and obtain the electrochemical device 100 that includes a conduction path with low resistance and has high output characteristics.

Regarding Difference in Number of Positive Lead Plates

Figure 18:
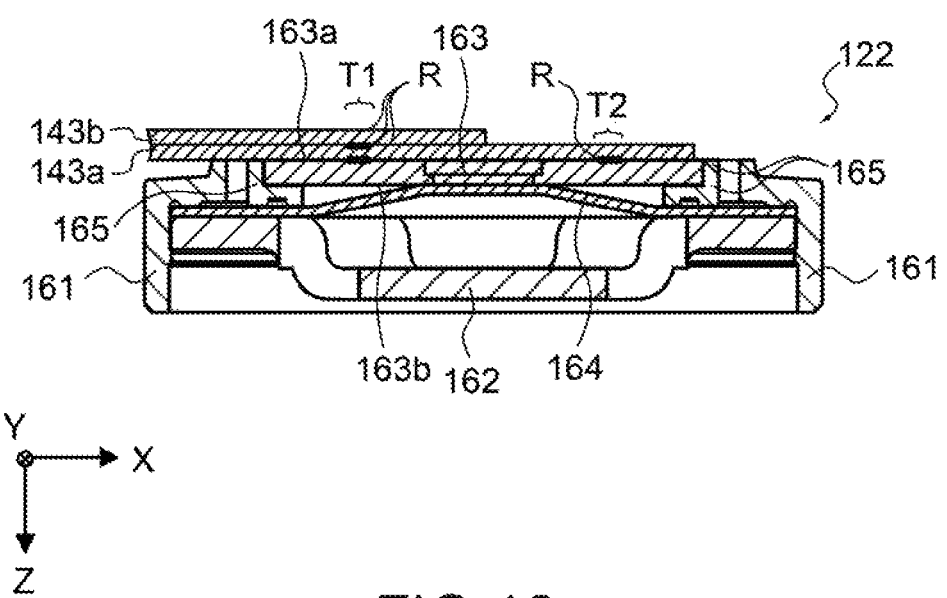
FIG. 18 is a cross-sectional view showing the positive lead plate welded to the connection plate of the sealing body.

The number of the positive lead plates 143 to be welded to the connection plate 163 is not limited to the above number. FIG. 18 is a schematic diagram showing the state in which two positive lead plates 143 are welded to the connection plate 163.

In this case, as shown in FIG. 18, the positive lead plate 143a in the lower layer may be welded at both the welding portion T1 and the welding portion T2, and the positive lead plate 143b in the upper layer may be welded at only the welding portion T1 not at the welding portion T2.

Figure 19:
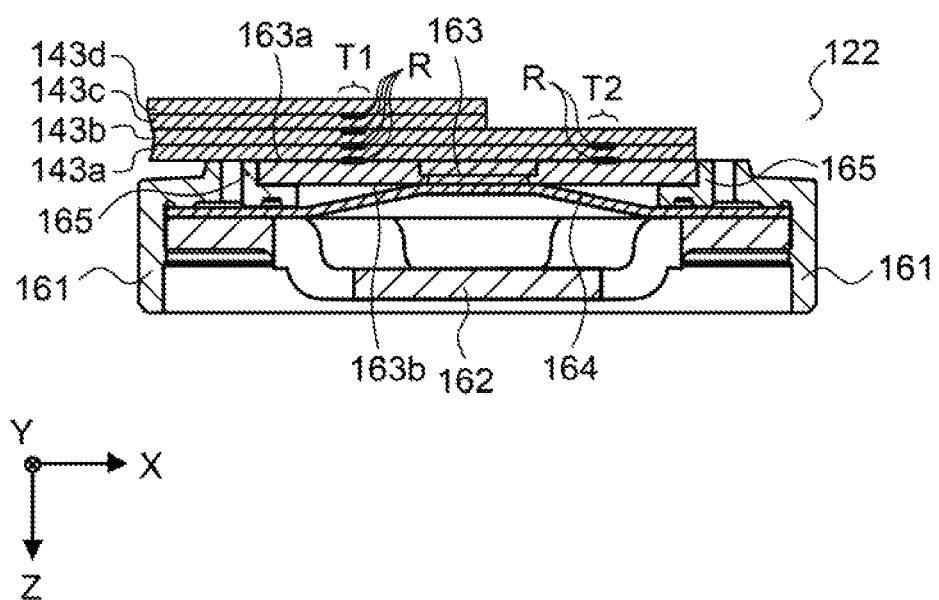
FIG. 19 is a cross-sectional view showing the positive lead plate welded to the connection plate of the sealing body.

Further, FIG. 19 is a schematic diagram showing the state in which four positive lead plates 143 are welded to the connection plate 163. As shown in FIG. 19, the positive lead plates 143a and 143b in the lower layer may be welded at both the welding portion T1 and the welding portion T2, and the positive lead plates 143c and 143d in the upper layer may be welded at only the welding portion T1 not at the welding portion T2.

Similarly, also in the case where five or more positive lead plates 143 are welded, by setting a difference in the number of the positive lead plates 143 between the welding portion T1 and the welding portion T2, it is possible to cause a large current to flow while preventing the positive lead plate 143 from being melted and cut.

FIG. 20 is a table showing the number of the positive lead plates 143 and an evaluation result at the welding portion T1 and the welding portion T2. The "double circle" indicates that the welding strength is very favorable. The "circle" indicates that the welding strength is favorable. The "triangle" indicates the welding strength is acceptable for use. The "X" indicates that the welding strength is insufficient.

Note that in any case, the positive lead plate 143 in the lower layer (on the side of the connection plate 163) is welded at both the welding portion T1 and the welding portion T2, and the positive lead plate 143 in the upper layer (on the side opposite to the connection plate 163) is welded at only the welding portion T1.

As shown in FIG. 20, in the case where the number of the positive lead plates 143 welded at the welding portion T1 is two, a sufficient welding strength can be achieved when the number of the positive lead plates 143 welded at the welding portion T2 is one. Further, in the case where the number of the positive lead plates 143 welded at the welding portion T1 is three or more, it is favorable that the difference in the number of the positive lead plates 143 between the welding portion T1 and the welding portion T2 is two.

This is because if the number of the positive lead plates 143 between the welding portion T1 and the welding portion T2 is too small, a current diverted to the positive lead plate 143 is large, which makes welding insufficient. Meanwhile, if the difference in the number of the positive lead plates 143 between the welding portion T1 and the welding portion T2 is too large, the positive lead plate 143 in the lower layer is melted and cut by a current value for sufficiently welding the positive lead plate 143 at the welding portion T1.

Regarding Number of Welding Portions

Although the positive lead plate 143 has been welded at two portions in the above description, the positive lead plate 143 may be welded at more welding portions.

Figure 21:
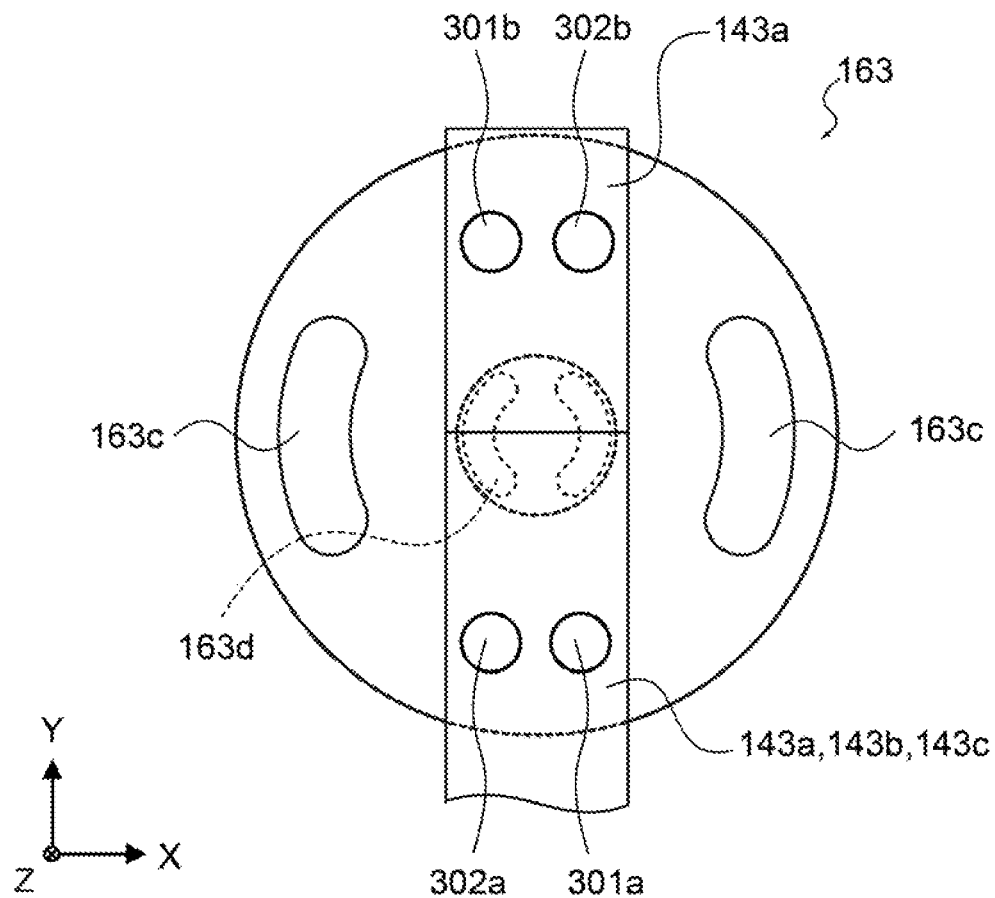
FIG. 21 is a plan view showing a welding portion of the positive lead plate to the connection plate of the sealing body in an electrochemical device according to an embodiment of the present disclosure.

FIG. 21 is a schematic diagram showing a welding method at the time of welding three positive lead plates 143 at four welding portions. As shown in FIG. 21, after performing resistance welding by causing the welding electrode 301a and the welding electrode 301b to abut on the positive lead plate 143, a welding electrode 302a and a welding electrode 302b may be caused to abut on the positive lead plate 143 to perform resistance welding.

As shown in FIG. 15, the welding electrode 301a and the welding electrode 302a are caused to abut on the positive lead plate 143c, and the welding electrode 301b and the welding electrode 302b are caused to abut on the positive lead plate 143a. Specifically, the welding portion T1 is formed at each of the abut portions of the welding electrode 301a and the welding electrode 302a, and the welding portion T2 is formed at each of the abut portions of the welding electrode 301b and the welding electrode 302b. Note that the abut portions of the welding electrode 301a and the welding electrode 302a may be replaced with each other.

Modified Example

Although the configuration in which the positive electrode lead plate 143 is joined to the sealing body 122 by resistance welding has been described, instead of the positive electrode lead plate 143, the negative electrode lead plates 133 may be joined to the sealing body 122 by the above-mentioned method. In this case, the positive electrode lead plate 143 may be joined to the exterior can 121.

It should be understood by those skilled in the art that various modifications, combinations, sub-combinations and alterations may occur depending on design requirements and other factors insofar as they are within the scope of the appended claims or the equivalents thereof.

What is claimed is:

1. A method of producing an electrochemical device, comprising:
   preparing
   an electricity storage device that includes a positive electrode, a negative electrode, and a separator, the positive electrode and the negative electrode being stacked via the separator and wound, the electricity storage device further including a plurality of lead plates electrically connected to one of the positive electrode and the negative electrode,
   a connection plate having a first main surface on a side of the electricity storage device and a second main surface opposite to the first main surface, and
   a rupture disc connected to the second main surface of the connection plate;
   stacking the plurality of lead plates and causing the plurality of stacked lead plates to be placed on the first main surface to form a first welding portion and a second welding portion both on the first main surface, wherein the plurality of lead plates is stacked at the first welding portion, and among the plurality of lead plates, a lead plate whose number being less than the number of lead plates stacked at the first welding portion is stacked at the second portion; and
   causing a first welding electrode facing the first main surface to abut on and contact the first welding portion, causing a second welding electrode facing the first main surface to abut on and contact the second welding portion, and applying a current between the first welding electrode and the second welding electrode to weld the plurality of lead plates to the connection plate.

2. The method of producing an electrochemical device according to claim 1, wherein
   the number of lead plates welded at the first welding portion is two, and
   the number of lead plates welded at the second welding portion is one.

3. The method of producing an electrochemical device according to claim 1, wherein the number of lead plates welded at the first welding portion is not less than three, and the number of lead plates welded at the second welding portion is two less than the number of lead plates welded at the first welding portion.

4. The method of producing an electrochemical device according to claim 1, wherein the plurality of lead plates is formed of aluminum.

5. The method of producing an electrochemical device according to claim 1, wherein the electrochemical device is a lithium ion capacitor.

* * * * *